United States Patent [19]
Muffett et al.

[11] Patent Number: 5,976,400
[45] Date of Patent: Nov. 2, 1999

[54] PHASE CHANGE MATERIAL AND USE

[75] Inventors: Dorothy J. Muffett, Plymouth; Stephen D. Prodoehl, Bloomington, both of Minn.

[73] Assignee: Thermo Solutions, Inc., Minneapolis, Minn.

[21] Appl. No.: 08/961,842

[22] Filed: Oct. 31, 1997

Related U.S. Application Data

[60] Provisional application No. 60/059,541, Sep. 19, 1997.

[51] Int. Cl.$^6$ ...................................................... C09K 5/06
[52] U.S. Cl. .................... 252/70; 62/60; 62/337; 62/371; 62/457.1; 62/530
[58] Field of Search .................. 252/70; 62/60, 62/337, 371, 457.1, 530

[56] References Cited

U.S. PATENT DOCUMENTS

| | | | |
|---|---|---|---|
| 4,037,650 | 7/1977 | Randall | 165/29 |
| 4,241,011 | 12/1980 | Hirozawa et al. | 422/13 |
| 4,304,798 | 12/1981 | Clapp et al. | 252/70 |
| 4,388,203 | 6/1983 | Nimerick et al. | 252/70 |
| 4,439,337 | 3/1984 | Nimerick et al. | 252/70 |
| 4,655,951 | 4/1987 | Hanazaki et al. | 252/70 |
| 4,949,549 | 8/1990 | Steidl et al. | 62/101 |
| 4,958,635 | 9/1990 | Roberts | 128/403 |
| 4,968,520 | 11/1990 | Wang | 426/524 |
| 5,423,996 | 6/1995 | Salyer | 252/70 |
| 5,489,391 | 2/1996 | Nawa et al. | 252/75 |
| 5,525,250 | 6/1996 | Hammond | 252/70 |
| 5,785,884 | 7/1998 | Hammond | 252/70 |
| 5,785,885 | 7/1998 | Kakiuchi et al. | 252/70 |

OTHER PUBLICATIONS

Patent Abstracts of Japan Abstract No. JP361219364A, abstract of Japanese Patent Specification No. 61–219364, Sep. 1986.

WPIDS Abstract No. 96–439802, abstract of Japanese Patent Specification No. 08–218063, Aug. 1996.

Japio Patent Abstract No. JP4110265769A, abstract of Japanese Patent Specification No. 10–265769, Oct. 1998.

*Primary Examiner*—Anthony Green
*Attorney, Agent, or Firm*—Kinney & Lange, P.A.

[57] ABSTRACT

A phase change material for maintaining a food product at a temperature of less than 0° F. The phase change material includes a mixture of an organic alcohol, a salt, and water. The organic alcohol has a concentration of between about 2 and 25 percent by weight. The salt has a concentration of between about 15 and 25 percent by weight.

22 Claims, 3 Drawing Sheets

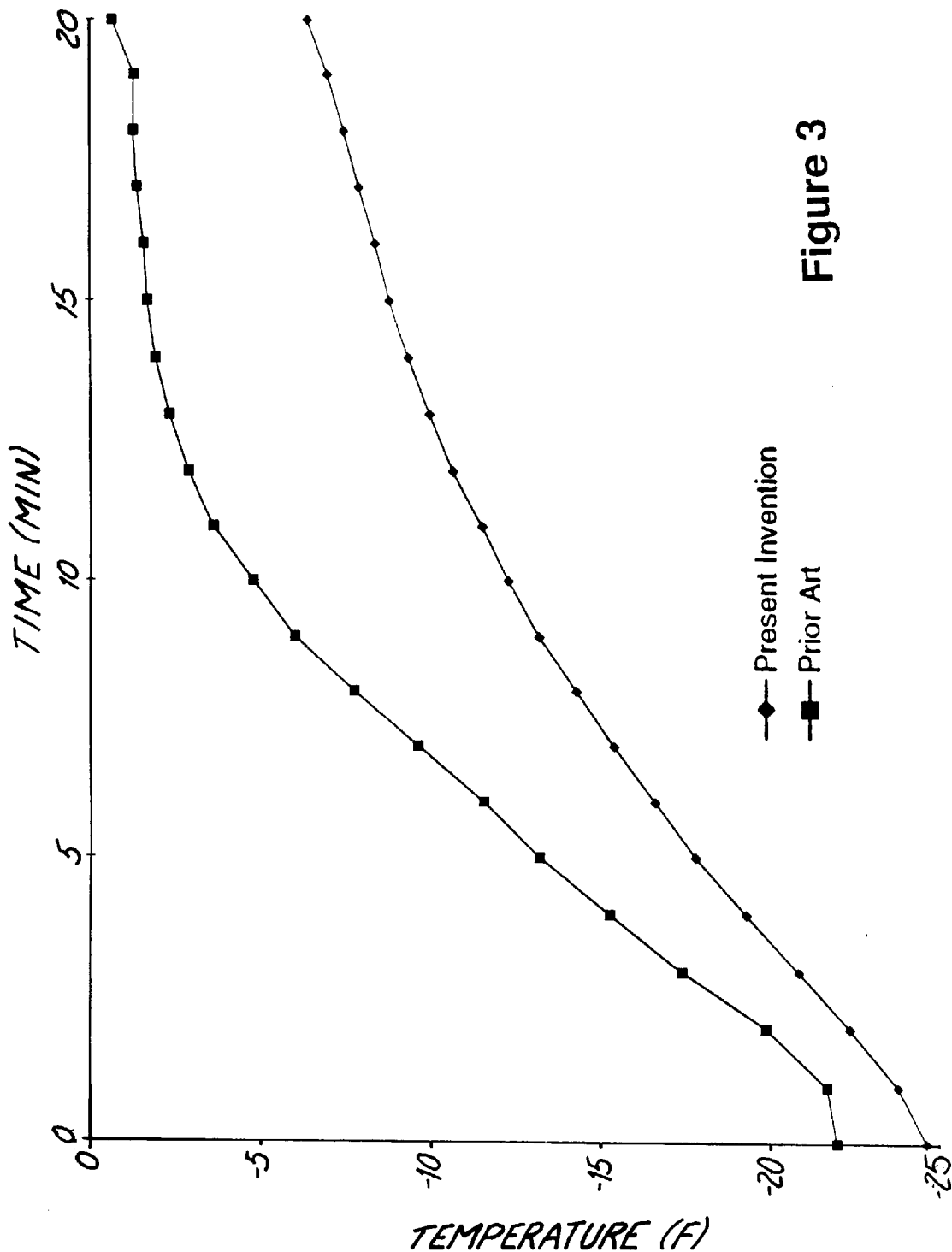

PHASE CHANGE MATERIAL AND USE

This application is based on provisional application U.S. Ser. No. 60/059,541 filed Sep. 19, 1997.

BACKGROUND OF THE INVENTION

The present invention is a phase change material more particularly, the present invention is a phase change material for maintaining a food product in a frozen state.

During the distribution of frozen food products, such as ice cream, it is essential to maintain the food products at a sufficiently low temperature so that the food products remain frozen prior to consumption. For example, home delivery services have been developed to deliver various food products to a consumer's home and thereby eliminate the need for the consumer to go to a store to purchase the food products.

It is not always possible to store food products in a mechanically cooled freezer compartment during the distribution of the frozen food product. This is particularly true with home delivered frozen food products where it is not always possible for the consumer to be at home when the frozen food products are delivered.

For these types of situations, the delivery company typically provides an insulated container at the consumer's home. The insulated container holds the frozen food products until the consumer arrives back at home and is able to put the frozen food products in a mechanically cooled freezer compartment within the consumer's home.

It is frequently necessary to place cooling aids in the insulated container to maintain the frozen food products at a sufficiently low temperature so that the food products remain frozen until the food products are removed from the insulated container. Because these cooling aids are ancillary to the purchase of the frozen food products, it is desirable to make the cooling aids as inexpensively as possible. Examples of cooling aids are ice, dry ice, and coolant pouches.

To ensure that the food products remain frozen until removed from the container, it is desirable for the cooling aids to be frozen to a temperature that is at least 5° F. less than the melting temperature of the frozen food products. At the same time, it is desirable to use a cooling aid where the frozen temperature of the cooling aid is not substantially below the frozen food product because of the cost associated with purchasing the cooling aid becomes progressively larger as lower temperatures are used. Additionally, using a cooling aid that has a temperature significantly below the frozen food product increases the likelihood that the cooling aid will cause freezer burn on the frozen food product.

It is also desirable for the cooling aids to have a melting temperature that is at least 5° F. less than the temperature of the frozen food product. If the cooling aid has a melting temperature that is within this range, a maximum amount of energy is extracted from the cooling aid.

While ice is plentiful and relatively inexpensive to produce, the is melting temperature of ice is greater than the melting temperature of many frozen food products. As such, ice is not a desirable choice for maintaining foods products at a sufficiently low temperature that the food products remain frozen.

Dry ice has a substantially lower melting temperature than most food products. However, the extremely low temperature of dry ice makes it likely that the dry ice will produce freezer burn on the food products. Additionally, the extremely low temperature of dry ice makes handling dry ice hazardous and it is not possible to reuse dry ice.

Prior art coolant pouches containing phase change materials while being reusable have melting temperatures that are not at least 5° F. lower than the melting point of the food products. As a result, the prior art coolant pouches are not very effective at maintaining the food products in a frozen state.

Cooling aids with these properties are commonly referred to as phase change materials because they are designed to change phase from a solid to a liquid while the cooling aid is used. It is also desirable for the cooling aid to be easily formulated from food-grade ingredients and readily change phases without the use of nucleating agents.

BRIEF SUMMARY OF THE INVENTION

The present invention is a phase change material for maintaining a food product at a temperature of less than 0° F. The phase change material includes a mixture of an organic alcohol, a salt, and water. The organic alcohol has a concentration of between 2 and 25 percent weight. The salt has a concentration of between about 15 and 25 percent by weight.

BRIEF DESCRIPTION OF THE DRAWINGS

FIG. 3 is a graph of temperature versus time for the use of phase change materials to maintain a food product at a frozen temperature.

DETAILED DESCRIPTION OF THE PREFERRED EMBODIMENTS

Figure 1:
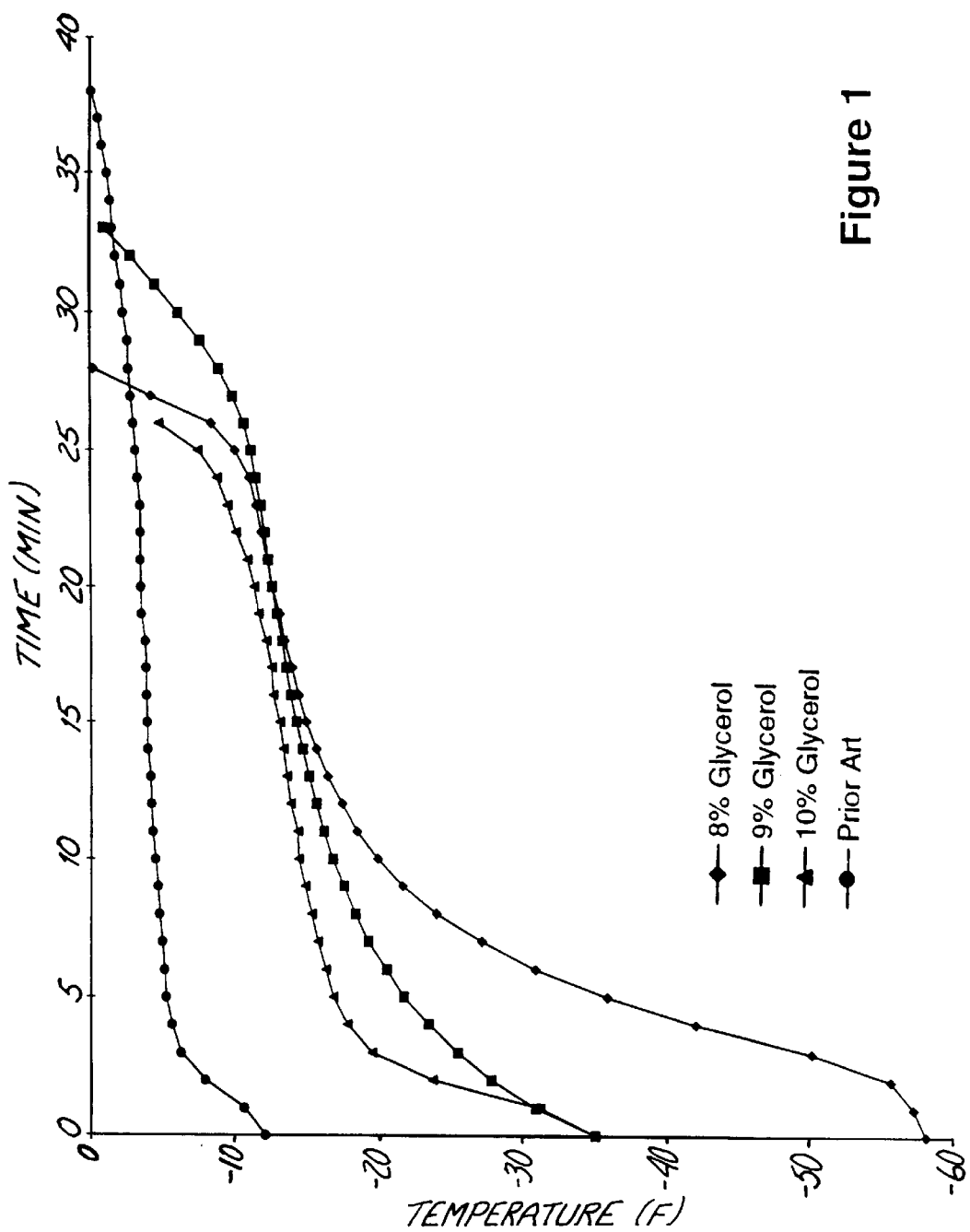
FIG. 1 is a graph of temperature versus time for phase change materials produced according to the present invention.

The present invention is a phase change material for maintaining a food product at a sufficiently low temperature so that the food product remains frozen while the food product is stored prior to consumption. The present invention also is a coolant pouch that contains the phase change material. The present invention additionally relates to a method of maintaining a food product a sufficiently low temperature so that the food product remains frozen while the food product is stored prior to consumption.

The phase change material produced according to the present invention exhibits a desirable melt temperature and a desirable melting range characteristics. Additionally, the phase change material of the present invention is readily formulated from food-grade ingredients and does not require the use of nucleating agents.

The phase change material of the present invention includes a mixture of organic alcohol, salt, and water. The organic alcohol has a concentration of between 2 and 25 percent by weight and preferably between 8 and 10 percent by weight. Unless indicated otherwise, all references to percent concentration are percent by weight.

Suitable organic alcohols for use with the present invention include ethanol, glycerol, isopropyl alcohol, lactitol, maltitol, mannitol, propylene glycol, sorbitol, or combinations thereof. As noted above, the organic alcohol used in formulating the phase change material is preferably formulated from food-grade ingredients to minimize concerns of the phase change material contaminating the food products.

In circumstances where it is not required that the phase change material be formulated from food-grade ingredients, it is possible to use additional organic alcohols, such as ethylene glycol, when formulating the phase change material.

The salt has a concentration of between 15 and 25 percent and preferably between 20 and 22 percent. One particularly suitable salt for formulating the phase change material is sodium chloride.

The phase change material may also include a thickener, such as guar gum, to provide the phase change material with an increased viscosity. The thickener may be added to the phase change material at a concentration of up to 2 percent. Preferably, the thickener is added to the phase change material at a concentration of between about 0.5 and 1.5 percent. The thickeners used in conjunction with the present invention do not affect the performance characteristics of the phase change material.

The phase change material may also include a preservative. Suitable preservatives for use with the present invention are potassium sorbate, sodium benzoate, or combinations thereof. The preservative may be added to the phase change material at a concentration of up to about 0.2 percent. Preferably, the preservative is added to the phase change material at a concentration of about 0.1 percent. The preservatives used in conjunction with the present invention do not effect the characteristics of the phase change material.

The phase change material is preferably prepared by first dissolving a selected amount of salt in water and then dissolving a selected amount of organic alcohol in water to make the phase change material. If desired, thickeners or preservatives are then mixed into the phase change material.

The phase change material has a melting point that is preferably less than about −8° F. For applications where the insulated container in which the phase change material is used has a high insulating value and where food products are to be maintained in a frozen state, little additional benefit is realized by formulating the phase change material to have a melting temperature of less than −16° F. Preferably, the melting point is between about −12° F. and −14° F.

The phase change material produced according to the present invention has a freezing point of between about −10° F. and −60° F. Preferably, the freezing point of the phase change material is between −20° F. and −25° F.

Formulating the phase change material according to the present invention enables the phase change material to maintain the food product at a temperature of between about 0° F. and −10° F. with an optimum use of the energy used for freezing the phase change material.

The phase change material is particularly suited for packaging in a hermetically sealed package. The package for the phase change material is preferably fabricated from a material that permits the phase change material to be cooled rapidly, such as with liquid nitrogen. Additionally, the packaging material should not become brittle when cooled.

One preferred packaging material for use with the present invention is a strong, clear, irradiated, biaxially oriented, heat-shrinkable, linear low-density polyolefin film A particularly suited irradiated, biaxially oriented, heat-shrinkable, linear low-density polyolefin film for use with the present invention is marketed under the name CLYSAR® HP by DuPont of Wilmington, Del., which has the physical properties set forth in Table 1.

TABLE 1

| Property | ASTM Test | Units | Gauge | | | | |
|---|---|---|---|---|---|---|---|
| | | | 60 | 75 | 100 | 125 | 150 |
| Haze (avg.) | D1003-61(77) | % | 1.4 | 1.5 | 1.6 | 1.9 | 2.0 |
| Gloss, 20° F. (min.) | D2457-70(77) | (photocell) | 145 | 145 | 140 | 135 | 130 |
| Shrinkage, 216° F. (10 min.) | D1204-84 | % (area) | 50 | 50 | 50 | 50 | 50 |
| Shrink Force 212° F. (avg.) | D2838-81 | g/in | 102 | 128 | 170 | 218 | 255 |
| Seal Strength (avg.) | F86-68(73) | g/in | 2,800 | 3,200 | 3,600 | 4,000 | 4,400 |
| Tensile Strength (avg.) | D882-80 | g/in | 3,275 | 4,100 | 5,540 | 6,800 | 8,200 |
| Stiffness Modulus (avg.) | D882-80 | kg/in | 11 | 13.6 | 18.2 | 22.7 | 27.2 |
| Elongation (avg.) | D882-80 | % | 130 | 130 | 130 | 130 | 130 |
| Tear Strength (avg.) | D1922-67(78) | g | 50 | 53 | 90 | 100 | 110 |
| COF, Kinetic | D1894 | | 0.25 | 0.25 | 0.22 | 0.20 | 0.20 |
| WVTR | E-96-8O | g/100 in$^2$/24 hr | 1.3 | 1.2 | 0.9 | 0.7 | 0.6 |
| Oxygen Permeability | D3985-81 | cm$^3$100in$^2$/24 hr/atm | 450 | 350 | 300 | 250 | 175 |
| CO$_2$ Transmission | D1434 | cm$^3$/100in$^2$/24 hr/atm | 1,456 | 1,322 | — | — | — |
| Yield | | in$^2$/lb | 44,130 | 40,410 | 30,170 | 24,160 | 20,090 |

The two pieces of the irradiated, biaxially oriented, heat-shrinkable, linear low-density polyolefin film are heated sealed together to produce a pouch. The pouch is filled with a selected amount of phase change material and then hermetically sealed to produce a coolant pouch.

The walls of the coolant pouch each preferably have a two layer thickness of the 150 gauge irradiated, biaxially oriented, heat-shrinkable, linear low-density polyolefin film. Constructing the coolant pouch in this manner reduces the water vapor transmission rate to a negligible level.

The coolant pouch is then cooled to a sufficient degree that the phase change material substantially changes from a liquid to a solid. The cooling process is preferably performed by pouring liquid nitrogen over the coolant pouch.

When there is between about 2 and 3 pounds of phase change material in the coolant pouch, between about 100 and 150 ounces of liquid nitrogen are typically needed to cool the phase change to a sufficient extent that the phase change material changes from a liquid to a solid.

The phase change material is preferably utilized in conjunction with an insulated container. The size and shape of the insulated container is selected based on the amount of food products that are intended to be stored in the insulated container. The type and thickness of the insulation used in the insulated container is preferably selected based on the ambient temperature in which the insulated container is intended to be used.

Typically, the insulated container is placed at a consumer's home. When the delivery service delivers the frozen food products, the food products are placed in the insulated container along with one of more coolant pouches. For most applications, the coolant pouches are preferably formed with a weight of approximately ½ pound. Placing the frozen food products in the insulated container with the coolant pouches maintains the food products at a sufficiently low temperature so that the food products remain frozen until the food products are removed from the insulated container by the consumer.

In one preferred embodiment, the coolant pouches are placed into a substantially cylindrical vacuum container. Preferably, 6 coolant pouches are utilized in the vacuum container. One particularly suited container for use with the phase change material of the present invention is described in a simultaneously filed application entitled METHOD OF USING PHASE CHANGE MATERIALS AND CONTAINER, which is assigned to the assignee of the present application and which has attorney docket no W337.12-0010. Using the coolant pouches in conjunction with a container disclosed in this related application is sufficient to maintain food products in a frozen state for between 36 and 48 hours.

Because the phase change material of the present invention exhibits a lower melting point than prior art phase change materials, the amount of the present phase change material that is needed to maintain a food product at a desired temperature is less than the amount of the prior art phase change materials.

EXAMPLES

The following Examples are presented to enhance the description but are not intended to thereby limit the scope of the present invention.

EXAMPLE 1

A series of phase change materials were prepared by mixing sodium chloride and then glycerol with water at selected concentration levels. Each of the mixtures are identified by the glycerol concentration in the phase change material and had a glycerol concentration of either 8, 9 or 10 percent. The 8 percent glycerol mixture had a sodium chloride concentration of about 22 percent. The 9 percent glycerol mixture had a sodium chloride concentration of about 21 percent. The 10 percent glycerol mixture had a sodium chloride concentration of about 20 percent.

The performance of the phase change materials of the present invention were compared with the performance of a prior art phase change material, which was marketed by Poly Foam Packers of Chicago, Ill. It is believed that the prior art phase change material contained a mixture of starch, sodium chloride, and water.

A specified amount of each phase change material was placed into a test. A temperature probe was then placed in contact with the phase change material Next, the test tube was immersed in an acetone filled beaker. Dry ice pellets were then placed in the beaker until the phase change material was frozen. Approximately 2–5 minutes after the phase change material froze, the test tube was removed from the beaker.

The test tube was then allowed to warm to ambient temperature. The temperature of the phase change material was measured at selected intervals and the results of the tests are reported in FIG. 1. As a point of reference, the prior art phase change material had an initial temperature of about $-12°$ F. but warmed to a temperature of above $-5°$ F. within five minutes.

Each of the phase change material samples according to the present invention remained at a temperature of less than $-10°$ F. for greater than 22 minutes. In particular, the 8 percent glycerol exhibited the lowest initial temperature. The 10 percent glycerol mixture exhibited the lowest melting temperature of the glycerol mixtures. The melting temperature of the 9 percent glycerol mixture was between the melting temperature of the 8 and 10 percent glycerol mixtures.

EXAMPLE 2

The procedure set forth in Example 1 was repeated using other organic alcohols to formulate the phase change material. The organic alcohols used in this Example were ethyl alcohol, isopropyl alcohol, mannitol, propylene glycol, and sorbitol. Each of the phase change material mixtures had an organic alcohol concentration of about 9 percent and a sodium chloride concentration of about 21 percent.

Figure 2:
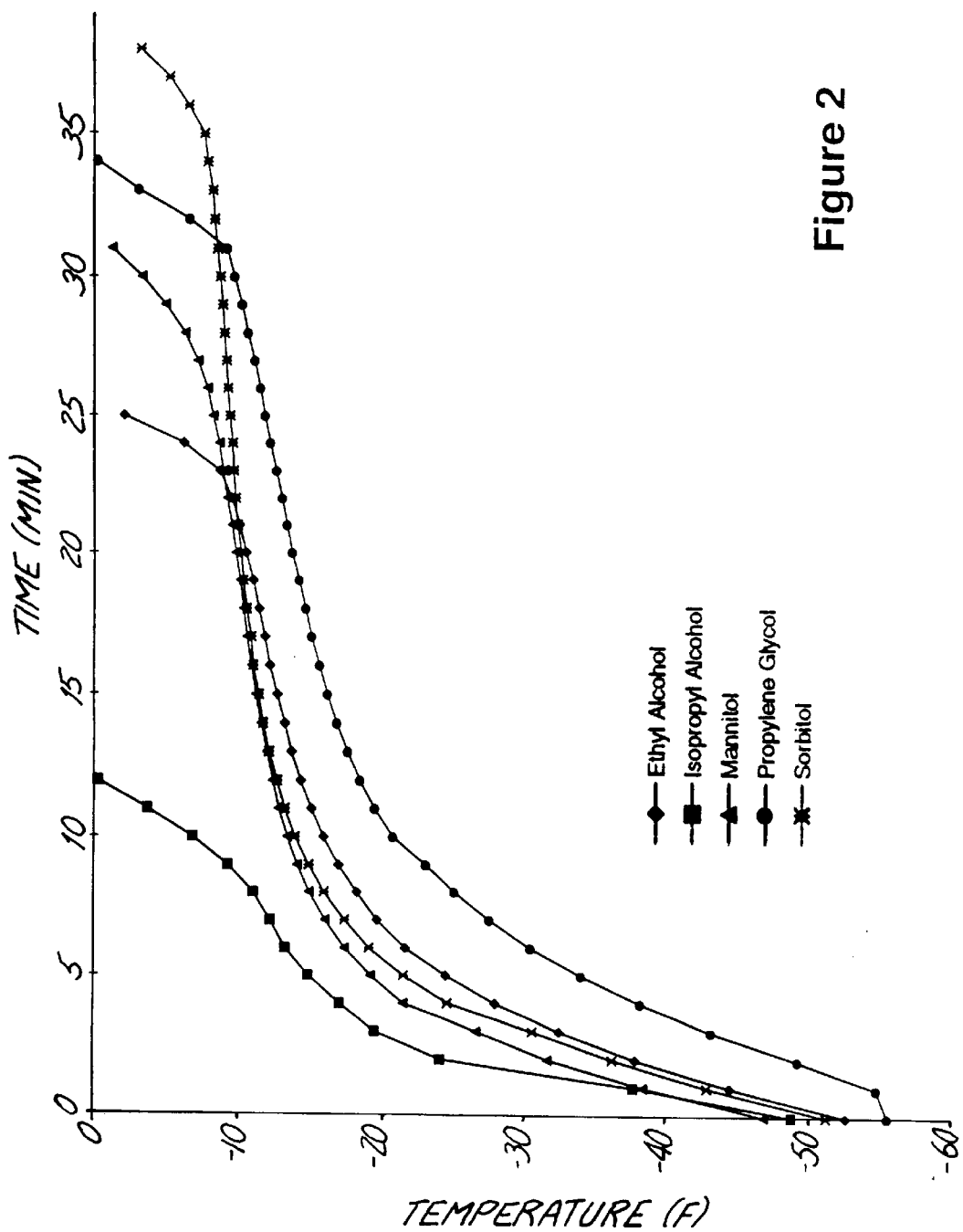
FIG. 2 is a graph of temperature versus time for additional phase change materials produced according to the present invention.

Approximately equal amounts of the phase change materials were placed in test tubes and the tubes were cooled in an acetone bath until the phase change material froze. The test tubes were removed from the acetone bath and the phase change materials were allowed to warm to ambient temperature. The temperature profiles exhibited by the phase change materials are reported in FIG. 2.

The melting temperature of the isopropyl alcohol mixture was less than $-10°$ F. Similar to the isopropyl alcohol mixture, the ethyl alcohol, mannitol, and sorbitol mixtures all exhibited melting temperatures of less than $-10°$ F. The propylene glycol mixture displayed the lowest melting temperature.

The melting points exhibited by ethyl alcohol, isopropyl alcohol, mannitol, propylene glycol, and sorbitol were similar to the glycerol mixture and each considerably lower to the prior art mixture described in Example 1.

EXAMPLE 3

The performance of the phase change material at maintaining a food product at a sufficiently low temperature so that the food product remains frozen was evaluated using the 9 percent glycerol mixture and the prior art mixture, which were prepared in Example 1.

Coolant pouches were prepared by hermetically sealing a total amount of about 2.25 pounds of the phase change material in packages made from irradiated, biaxially oriented, heat-shrinkable, linear low-density polyolefin film (CLYSAR® HP). The coolant pouches were then cooled using about 125 ounces of liquid nitrogen.

The cooled coolant pouches were placed in a vacuum container with a frozen food product that weighed approximately 6 pounds. The temperature of the food product was measured and the results of these measurements are reported in FIG. 3.

The phase change material of the present invention maintained the food product at a temperature of less than −10° F. for nearly twice as long as the prior art phase change material. Additionally, by the end of the 20 minute study, the food product cooled with the prior art phase change material was at a temperature of nearly 0° F. while the food product cooled with the phase change material of the present invention remained at a temperature of less than −6° F.

Although the present invention has been described with reference to preferred embodiments, workers skilled in the art will recognize that changes may be made in form and detail without departing from the spirit and scope of the invention.

We claim:

1. A coolant pouch for maintaining a food product at a temperature of less than 0° F., the coolant pouch comprising:
   a phase change material comprising a mixture of an organic alcohol, sodium chloride, and water, wherein the organic alcohol has a concentration of between about 2 and 25 percent by weight, and wherein the sodium chloride has a concentration of between about 15 and 25 percent by weight; and
   a hermetically sealed container containing the phase change material.

2. The coolant pouch of claim 1, wherein the concentration of the organic alcohol in the phase change material is between about 8 and 10 percent by weight.

3. The coolant pouch of claim 1, wherein the organic alcohol in the phase change material is selected from the group consisting of ethanol, ethylene glycol, glycerol, isopropyl alcohol, lactitol, maltitol, mannitol, sorbitol, propylene glycol and combinations thereof.

4. The coolant pouch of claim 1, wherein the concentration of the salt in the phase change material is between about 20 and 22 percent by weight.

5. The coolant pouch of claim 1, wherein the phase change material further comprises a thickener.

6. The coolant pouch of claim 5, wherein the thickener is added to the phase change material at a concentration of between about 0.5 and 1.5 percent by weight.

7. The coolant pouch of claim 5, wherein the thickener is guar gum.

8. The coolant pouch of claim 1, wherein the hermetically sealed container is formed from an irradiated, biaxially oriented, heat-shrinkable, linear polyolefin film.

9. The phase change material of claim 1, wherein the phase change material further comprises a preservative.

10. A coolant pouch for maintaining a food product in a frozen state, the coolant pouch comprising:
    a phase change material comprising an organic alcohol, a salt, and water, wherein the organic alcohol has a concentration of between about 2 and 25 percent by weight, and wherein the salt has a concentration of between about 15 and 25 percent by weight; and
    a hermetically sealed container containing the phase change material.

11. The coolant pouch of claim 10, wherein the organic alcohol is selected from the group consisting of ethanol, ethylene glycol, glycerol, isopropyl alcohol, lactitol, maltitol, mannitol, sorbitol, propylene glycol and combinations thereof.

12. The coolant pouch of claim 10, wherein the salt is sodium chloride.

13. The coolant pouch of claim 10, wherein the phase change material further comprises a thickener.

14. The coolant pouch of claim 13, wherein the phase change material further comprises a preservative.

15. The coolant pouch of claim 14, wherein the preservative is added to the phase change material at a concentration of up to about 1 percent by weight.

16. The coolant pouch of claim 14, wherein the preservative is potassium sorbate, sodium benzoate, or combinations thereof.

17. The coolant pouch of claim 13, wherein the thickener is added to the phase change material at a concentration of between about 0.5 and 1.5 percent by weight.

18. The coolant pouch of claim 13, wherein the thickener is guar gum.

19. The coolant pouch of claim 10, wherein the phase change material further comprises a preservative.

20. The coolant pouch of claim 19, wherein the preservative is added to the phase change material at a concentration of up to about 1 percent by weight.

21. The coolant pouch of claim 19, wherein the preservative is potassium sorbate, sodium benzoate, or combinations thereof.

22. The coolant pouch of claim 10, wherein the hermetically sealed container is formed from an irradiated, biaxially oriented, heat-shrinkable, linear polyolefin film.

* * * * *

UNITED STATES PATENT AND TRADEMARK OFFICE
CERTIFICATE OF CORRECTION

PATENT NO. : 5,976,400

DATED : NOVEMBER 2, 1999

INVENTOR(S) : DOROTHY J. MUFFETT ET AL.

It is certified that error appears in the above-identified patent and that said Letters Patent is hereby corrected as shown below:

Col. 7, line 29, delete "1", insert --10--

Col. 7, line 37, delete "1", insert --10--

Signed and Sealed this

Twenty-fourth Day of October, 2000

Attest:

Q. TODD DICKINSON

*Attesting Officer*  *Director of Patents and Trademarks*